(12) United States Patent
Boland

(10) Patent No.: US 9,096,195 B2
(45) Date of Patent: Aug. 4, 2015

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 1194 days.

(21) Appl. No.: 12/933,483

(22) PCT Filed: Mar. 16, 2009

(86) PCT No.: PCT/EP2009/053086
§ 371 (c)(1),
(2), (4) Date: Jan. 14, 2011

(87) PCT Pub. No.: WO2009/115494
PCT Pub. Date: Sep. 24, 2009

(65) Prior Publication Data
US 2011/0113581 A1   May 19, 2011

(30) Foreign Application Priority Data

Mar. 20, 2008 (EP) .................................... 08102804

(51) Int. Cl.
*B60S 1/38* (2006.01)
*B60S 1/40* (2006.01)

(52) U.S. Cl.
CPC ............... *B60S 1/381* (2013.01); *B60S 1/3889* (2013.01); *B60S 1/3853* (2013.01); *B60S 1/3858* (2013.01); *B60S 1/3881* (2013.01); *B60S 2001/382* (2013.01); *B60S 2001/3818* (2013.01); *B60S 2001/3822* (2013.01)

(58) Field of Classification Search
CPC .... B60S 1/3853; B60S 1/3858; B60S 1/3886; B60S 1/3887; B60S 1/3889; B60S 1/3881; B60S 1/381; B60S 2001/3818; B60S 2001/3822
USPC ........... 15/250.43, 250.44, 250.451–250.454, 15/250.361, 250.201, 250.48, 250.33, 15/250.32
See application file for complete search history.

(56) References Cited

U.S. PATENT DOCUMENTS

| | | | |
|---|---|---|---|
| 2,657,415 A * | 11/1953 | Rappl ...................... | 15/250.361 |
| 4,722,112 A * | 2/1988 | Schaub et al. ........... | 15/250.451 |
| 6,161,248 A * | 12/2000 | Merkel et al. .............. | 15/250.32 |
| 6,233,779 B1 * | 5/2001 | Nelson, Sr. ................ | 15/250.41 |
| 2007/0022556 A1 * | 2/2007 | Walworth et al. ........ | 15/250.201 |
| 2007/0174989 A1 * | 8/2007 | Moll et al. ............... | 15/250.201 |
| 2008/0052865 A1 * | 3/2008 | Chiang ...................... | 15/250.43 |

FOREIGN PATENT DOCUMENTS

| | | |
|---|---|---|
| DE | 196 45 170 A1 | 5/1998 |
| DE | 103 41 275 A1 | 3/2005 |
| DE | 10 2005 062462 A1 | 6/2007 |

(Continued)

*Primary Examiner* — Gary Graham
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade, which includes at least one longitudinal groove, in which groove a longitudinal strip of the carrier element is disposed and comprises a connecting device for an oscillating arm, the wiper blade comprises an elongated upper holding part and an elongated lower wiping part of a flexible material, wherein the holding part comprises downwardly extending side arms, seen in cross-section, for holding the wiper part from the outside in a lateral region thereof, wherein the at least one longitudinal groove having a open circumference is provided on the holding part at an upper side thereof facing away from the wiping part, and wherein the connecting device and the strip are provided with mutually cooperating protrusion/hole means for interconnecting the connecting device and the strip through a snapping connection.

14 Claims, 3 Drawing Sheets

(56) References Cited

FOREIGN PATENT DOCUMENTS

| | | | |
|---|---|---|---|
| EP | 1627787 | A | 2/2006 |
| FR | 2871127 | A | 12/2005 |
| FR | 2 890026 | A | 3/2007 |
| WO | WO 01/07304 | A | 2/2001 |

\* cited by examiner

WINDSCREEN WIPER DEVICE

BACKGROUND OF THE INVENTION

1. Technical Field

The present invention relates to a windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, wherein ends of the longitudinal strip are connected to a respective connecting piece, which windscreen wiper device comprises a connecting device for an oscillating arm.

2. Related Art

Such a windscreen wiper device is known from international (PCT-) patent publication no. WO 02/090155 in the name of the same Applicant. The prior art windscreen wiper device is in particular designed as a "yokeless" wiper device or "flat blade", wherein use is no longer made of several yokes pivotally connected to each other, but wherein the wiper blade is biassed by the carrier element, as a result of which it exhibits a specific curvature. In this known windscreen wiper device the wiper blade includes two opposing longitudinal grooves on its longitudinal sides, in which grooves spaced-apart longitudinal strips of the carrier element are disposed. Neighbouring ends of the longitudinal strips are interconnected by the respective connecting piece.

A sometimes felt disadvantage of the windscreen wiper device as described in the above international (PCT-) patent publication is the following. The connecting device shown therein comprises clamping members that are integral therewith, which engage around longitudinal sides of the longitudinal strips that face away from each other, as a result of which the connecting device is attached to the unit consisting of the wiper blade and the strips. In order to lock the connecting device in a direction along the longitudinal strips, in practice the strips are provided with a recess at their exterior longitudinal side, so that the clamping members of the connecting device rest in the recess. Obviously, cutting such a precisely shaped recess in each longitudinal strip needs additional tools and an extra step in manufacturing the windshield wiper device.

SUMMARY OF THE INVENTION AND ADVANTAGES

It is an object of the invention to improve the prior art, that is to overcome the drawbacks of a windscreen wiper device known from the above international (PCT-) patent publication, wherein the connecting device and the unit consisting of the wiper blade and the strips are interconnected in a durable, solid manner, without the need of additional tools and an extra cutting step in the manufacturing process of the windshield wiper device.

In order to accomplish that objective, a windscreen wiper device of the kind referred to in the introduction according to the invention is characterized in that the wiper blade comprises an elongated upper holding part and an elongated lower wiping part of a flexible material, wherein the holding part holds the wiping part, wherein the holding part comprises downwardly extending side arms, seen in cross-section, for holding the wiping part from the outside in a lateral region thereof, wherein the at least one longitudinal groove having a open circumference is provided on the holding part at an upper side thereof facing away from the wiping part, and wherein the connecting device and the strip are provided with mutually cooperating protrusion/hole means for interconnecting the connecting device and the strip through a snapping connection. Particularly, the connecting device comprises a downwardly extending protrusion, wherein the strip comprises a correspondingly shaped hole, and wherein the connecting device and the strip are interconnected through snapping the protrusion inside the hole. More in particular, the hole is made in the strip through a stamping, cutting or sawing operation included in the die or mold for stamping, cutting or sawing the strip as such. the hole does not decrease the mechanical resistance of the longitudinal strip in a significant manner. More in particular, the protrusion extends in downward direction from a bottom of the connecting device. Preferably, the side arms of the holding part pivotally engage the wiping part from the outside in a lateral region thereof, so that a mechanical articulation is realized between the holding part and the wiping part, wherein the holding part holds the wiping part allowing the wiping part to make pivotal or hingeable movements relative to the holding part during use. In use the pivotal movements of the wiping part correspond to oscillatory movements of the oscillating arm. Due to the mechanical articulation the wiping part will not have to bend to follow the oscillatory movements of the oscillating arm, so that a permanent deformation of the wiping part as a result of stress in the rubber thereof is avoided.

In a preferred embodiment of a windscreen wiper device in accordance with the invention, the connecting device is slidably mounted onto the holding part. In the alternative, the connecting device is snappingly mounted onto the holding part in a direction transverse to the longitudinal direction of the holding part.

In another preferred embodiment of a windscreen wiper device according to the invention, the connecting pieces and the strip are provided with mutually cooperating protrusion/hole means for interconnecting the connecting pieces and the strip through a snapping connection.

In another preferred embodiment of a windscreen wiper device in accordance with the invention, each connecting piece comprises a downwardly extending protrusion, wherein the strip comprises a correspondingly shaped hole, and wherein each connecting piece and the strip are interconnected through snapping the protrusion inside the hole. Again, the hole is preferably made in the strip through a stamping, cutting or sawing operation included in the die or mold for stamping, cutting or sawing the strip as such. Further, the protrusion particularly extends in downward direction from a bottom of the connecting pieces.

In another preferred embodiment of a windscreen wiper device according to the invention, the side arms of the holding part pivotally engage the wiping part from the outside in a lateral region thereof. Particularly, the holding part further comprises additional downwardly extending engaging means for pivotally engaging the wiping part in an upper region thereof. the additional engaging means ensure that a wiping lip of the wiping part is tumbled over at each turning point of its oscillary movement with the biggest reversal torque.

In another preferred embodiment of a windscreen wiper device in accordance with the invention, the wiping part comprises a wiping lip, a neck extending from the wiping lip, as well as an enlarged head extending from the neck, and wherein the enlarged head is mounted into a hollow chamber defined by the side arms of the holding part. the enlarged head preferably has a circular, elliptical, square, rectangular, rhomboid or heart-shaped cross-section. the wiping lip is placed in abutment with a windscreen to be wiped. the wiping lip, the neck and the enlarged head particularly are in one piece and extend in longitudinal direction along the entire length of the wiper blade.

Particularly, the additional engaging means engage the enlarged head at the location of its upper surface. More in particular, the engaging means comprise a downwardly extending (elongated) protrusion engaging the enlarged head in a correspondingly shaped slit thereof. Preferably, the protrusion extends along the entire length of the wiper blade and is made in one piece with the holding part.

In another preferred embodiment of a windscreen wiper device according to the invention the arms of the holding part comprise inwardly extending end parts, wherein the neck is located at least partly between the end parts, and wherein the enlarged head is located above the end parts. In other words, the enlarged head is confined in the hollow chamber, wherein the hook-shaped end parts further retain the wiping part onto the holding part. Particularly, the hollow chamber comprises a lubricant in order to allow smooth pivot movements of the wiping part without wear.

In another preferred embodiment of a windscreen wiper device according to the invention, the holding part is provided with a spoiler at a side thereof facing away from the wiping part. the spoiler may be provided with engaging members engaging around longitudinal sides of the holding part. Preferably, the spoiler is entirely detachably connected to the holding part. In the alternative, the spoiler is in one piece with the holding part.

The holding part and the wiping part preferably extend in longitudinal direction along the entire length of the wiper blade. In other words, the wiper blade consists of two mutually cooperating constructional elements, namely the holding part and the wiping part. the parts are preferably slidably connected to each other, wherein the enlarged head of the wiping part is slidably mounted into the hollow chamber of the holding part. the hollow chamber extends along the entire length of the wiper blade so as to form a channel with two open ends. One of the open ends of the channel forms an entrance through which the wiping part as a separate construction element can be slid by hand into the channel until the wiping part is finally retained onto the holding part (the first position). the open end also acts as an exit through which the wiping part can be slid by hand from the first position until the wiping part as a separate "loose" construction element can be replaced or repaired (the second position).

The wiping part is at least substantially made of an elastomeric material, such as rubber, wherein the holding part is at least substantially made of a plastic material.

THE DRAWINGS

The invention will now be explained in more detail with reference to figures illustrated in a drawing, wherein.

DETAILED DESCRIPTION

Figure 1:
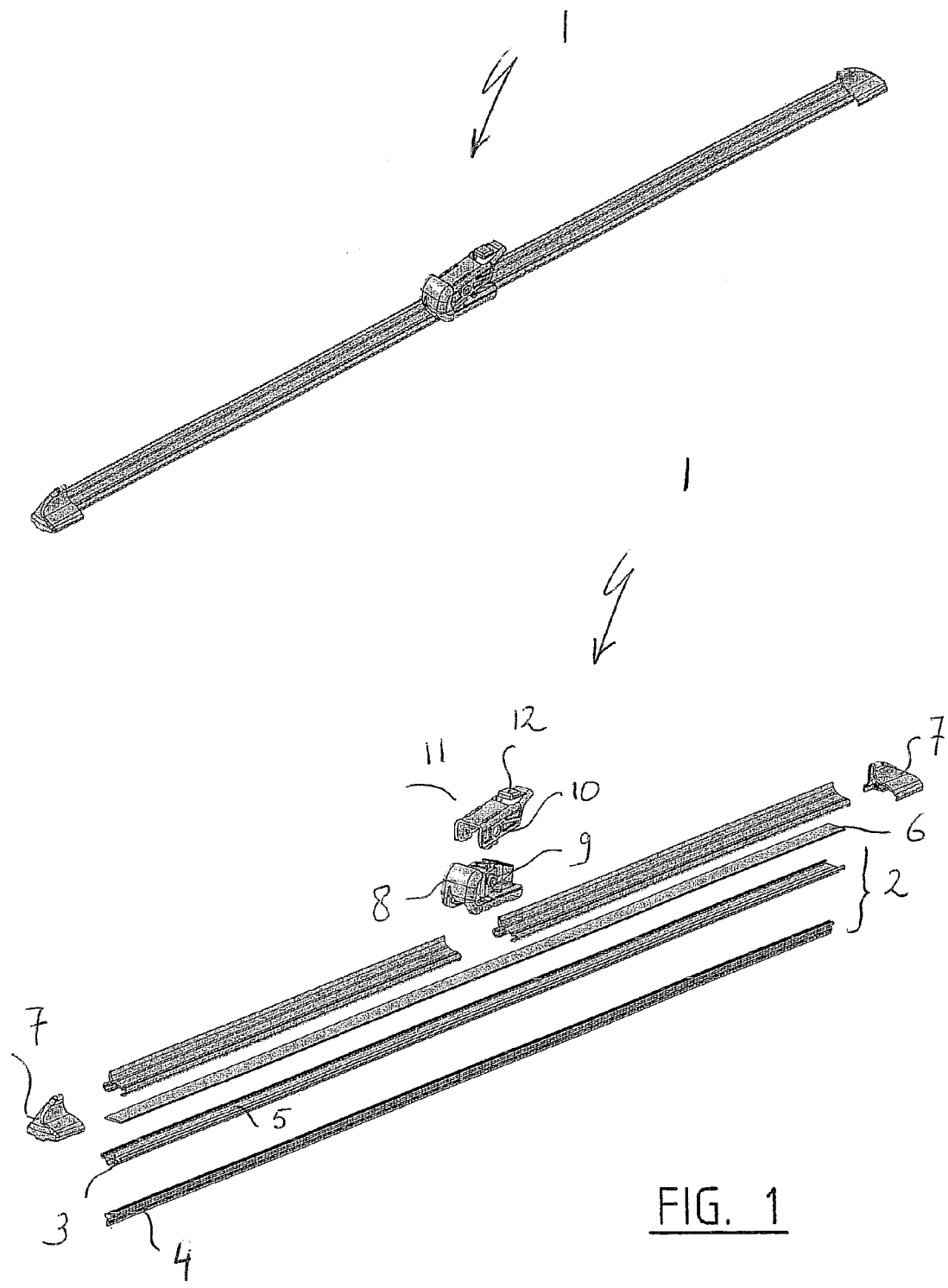
FIG. 1 shows a perspective view and an exploded view of a windscreen wiper device according to a preferred embodiment of the invention.

FIG. 1 shows a preferred variant of a windscreen wiper device 1 according to the invention, the windscreen wiper device 1 is built up of a wiper blade 2 consisting of a plastic elongated upper holding part 3 and an elastomeric elongated lower wiping part 4, both extending in longitudinal direction along the entire length of the wiper blade 2. In the holding part 3 a central longitudinal groove 5 is formed, in which a longitudinal strip 6 made of spring band steel is fitted (FIGS. 2 and 3). the strip 6 forms a flexible carrier element for the rubber wiper blade 2, as it were, which is thus biased in a curved position (the curvature in operative position being that of a windscreen to be wiped). Outer ends of the strip 6 are connected on either side of the windscreen wiper device 1 to connecting pieces 7.

The windscreen wiper device 1 is furthermore built up of a connecting device 8 of plastic or metallic material for an oscillating wiper arm (not shown With reference to FIG. 1 the connecting device 8 comprises two cylindrical protrusions 9 extending outwards on either side of the connecting device 8. These protrusions 9 pivotally engage in identically shaped cylindrical recesses 10 of a plastic joint part 11. In the alternative the recesses 10 may have a non-closed shape (i.e. open circumference). the protrusions 9 act as hearing surfaces at the location of a pivot axis in order to pivot the joint part 11 (and the oscillating arm attached thereto) about the pivot axis near one end of the oscillating arm. The protrusions 9 are preferably in one piece with the connecting device 8; in the alternative, the protrusions 9 are part of a single pivot pin perpendicular to the connecting device 8. The joint part 11 comprises one resilient tongue 12 extending outwardly, while the oscillating arm has an U-shaped cross-section at the location of its connection to the joint part 11, so that the tongue 12 engages in an identically shaped hole provided in a base of the U-shaped cross-section.

For mounting the connecting device 8 with the wiper blade 2 onto oscillating arm, the joint part 11 being already clipped onto the connecting device 8 is pivoted relative to the connecting device 8, so that the joint part 11 can be easily slid on a free end of the oscillating arm. During this sliding movement the resilient tongue 12 is initially pushed in against a spring force and then allowed to spring back into the hole, thus snapping, that is clipping the resilient tongue 12 into the hole. This is a so-called bayonet-connection. The oscillating arm together with the joint part 11 may then be pivoted back in a position parallel to the wiper blade 2 in order to be ready for use. By subsequently pushing in again the resilient tongue 12 against the spring force (as if it were a push button), the connecting device 8 and the joint part 11 together with the wiper blade 2 may be released from the oscillating arm 8. Dismounting the connecting device 8 with the wiper blade 2 from the oscillating arm is thus realized by sliding the connecting device 8 and the joint part 11 together with the wiper blade 2 in a direction away from the oscillating arm.

Figure 2:
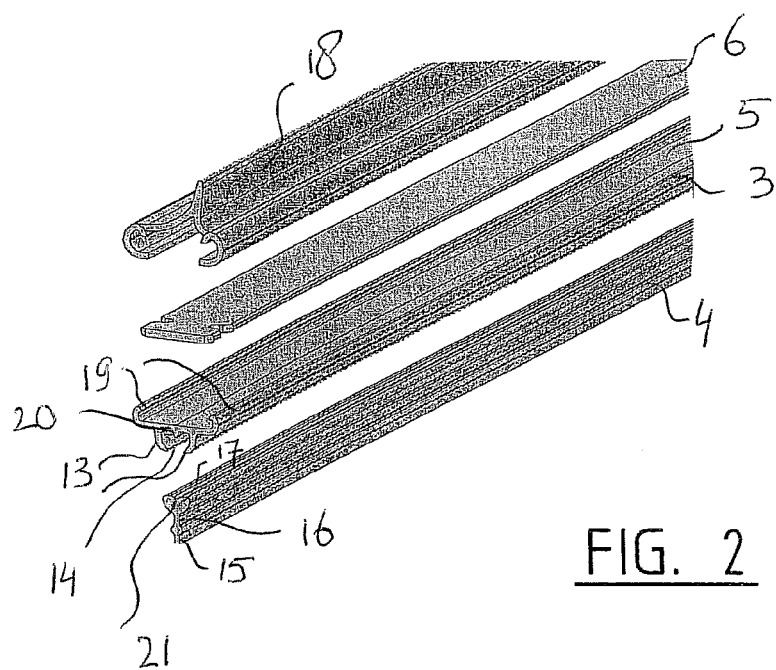
FIGS. 2 and 3 are perspective views of parts of the windscreen wiper of FIG. 1, partly in exploded view.

As can be seen from FIG. 2, the holding part 3 is provided with downwardly extending side arms 13 in one piece therewith, seen in cross-section, thus defining a hollow chamber or space 14, again seen in cross-section. the hollow chamber 14 extends in longitudinal direction along the entire length of the wiper blade 2, so as to form a channel with two open outer ends. Again referring to FIG. 2, the wiping part 4 consists of a wiping lip 15, a neck 16 extending from the wiping lip 15, as well as an enlarged head 17 extending from the neck 16 and having a heart-shaped cross-section. the parts 3,4 are slidably connected to each other, wherein the enlarged head 17 of the wiping part 4 is slidably mounted into the hollow channel of the holding part 3. One of the open ends of the channel forms an entrance through which the wiping part 4 as a separate construction element can be slid by hand into the channel until the wiping part 4 is finally retained onto the holding part 3 (the first or holding position). the open end also acts as an exit through which the wiping part 4 can be slid by hand from the first position until the wiping part 4 as a separate "loose" construction element can be replaced or repaired (the second position). The side arms 13 of the holding part 3 pivotally engage the enlarged head 17 of the wiping part 4, so as to allow a pivotal or hingeable movement of the wiping part 4 when the oscillating wiper arm 9 attached to the holding part 3 makes a corresponding oscillatory movement.

As shown, the holding part 3 is connected to a detachable spoiler 18 at a side thereof facing away from the wiping part 4, wherein the spoiler 18 is equipped with engaging members engaging around longitudinal sides 19 of the holding part 3. the longitudinal sides 19 are bend inwardly to firmly retain the longitudinal strip 6 inside the groove 5.

With reference to FIG. 2, a bottom of the holding part 3 is provided with additional engaging means in the form of a downwardly extending protrusion 20 which extends in longitudinal direction along a part of the length of the wiper blade 2 or along the entire length thereof. the protrusion 20 engages into a correspondingly shaped slit 21 provided on an upper surface of the hollow chamber 14 by means of free ends of the side arms 13 and the protrusion 20. Hence, an unstable design is obtained, wherein the torque is maximal when the wiping lip 15 tumbles over at each turning point of its oscillatory movement.

Figure 3:
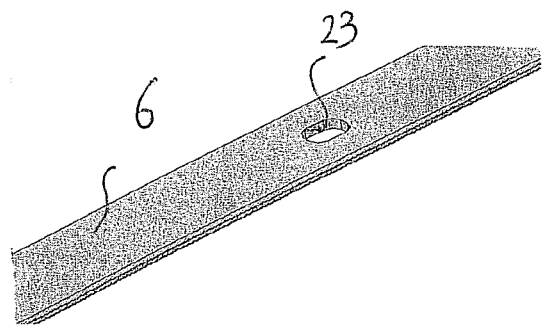
Figure 3:
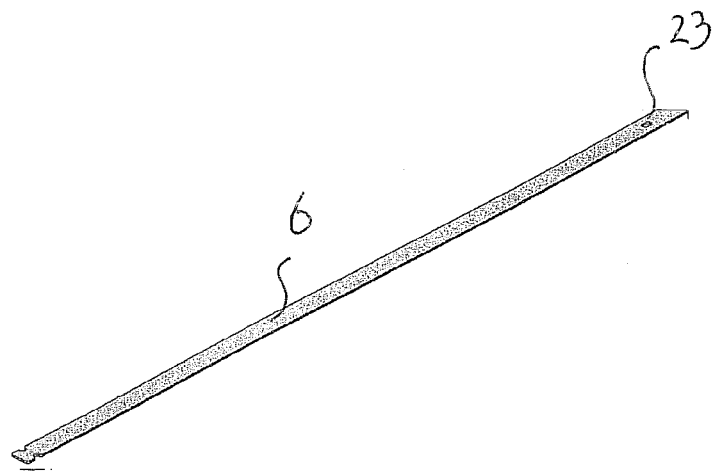
Figure 4:
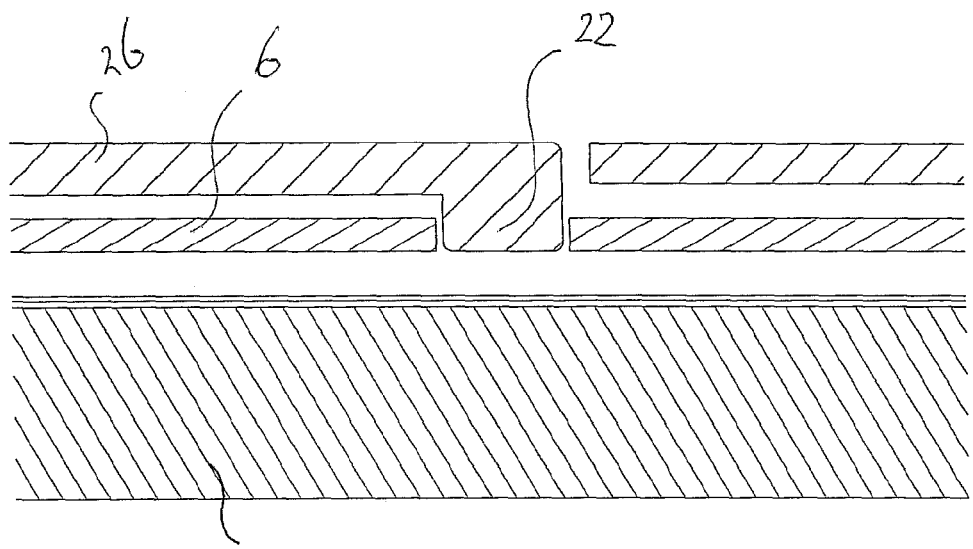
FIGS. 4 and 5 are schematic cross-sectional views of the interconnection of the connecting device (FIG. 4), the connecting pieces (FIG. 5) and the longitudinal strips.

Referring to FIGS. 3 and 4, the connecting device 8 comprises a downwardly extending protrusion 22, while the strip 6 comprises a correspondingly shaped hole 23. the connecting device 8 and the strip 6 are thus interconnected through snapping or clipping the protrusion 22 inside the hole 23. the snapping or clipping operation is realized by sliding the connecting device 8 onto the holding part 3.

As can be seen from FIG. 4, the protrusion 22 is part of a resilient tongue 26 located at the bottom of the connecting device 8.

Figure 5:
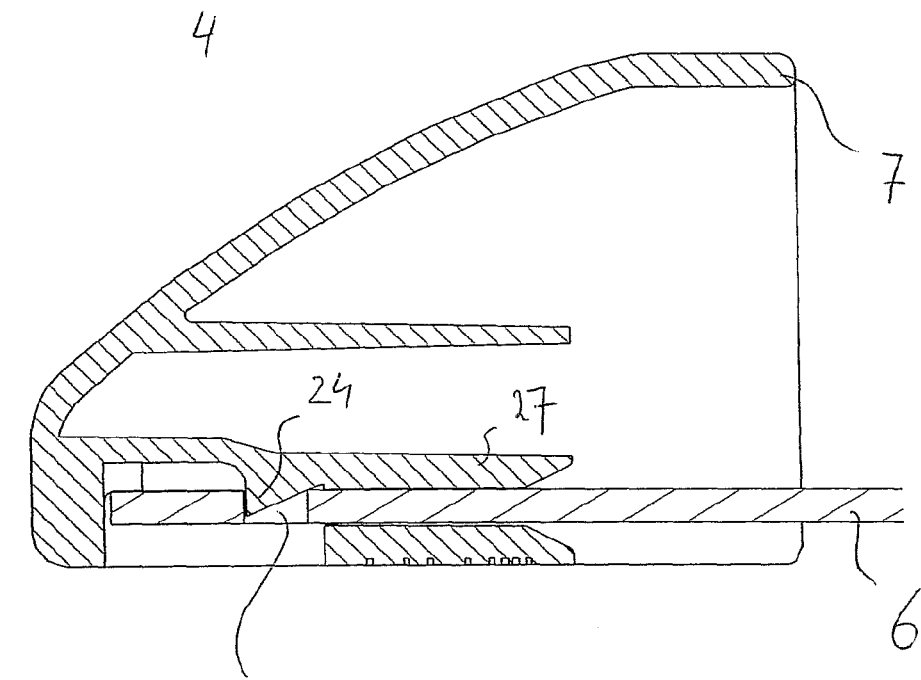

As can be seen in FIG. 5, each connecting piece 7 comprises a downwardly extending protrusion 24, wherein the strip 6 comprises near its ends a correspondingly shaped hole 25. Each connecting piece 7 and the strip 6 are interconnected through snapping the protrusion 24 inside the hole 25. As can be seen from FIG. 5, the protrusion 24 is part of a resilient tongue 27 at the bottom of the connecting piece 7.

Although not depicted in the figures, it will be clear for a person skilled in the art that the oscillating wiper arm 9 is connected to a mounting head fixed for rotation to a shaft driven by a small motor. In use, the shaft rotates alternately in a clockwise and in a counter-clockwise sense carrying the mounting head into rotation also, which in turn draws the oscillating wiper arm 9 into rotation and by means of the connecting device 8 moves the wiper blade 2.

The invention is not restricted to the embodiments shown, but also extends to other preferred variants falling within the scope of the appended claims.

The invention claimed is:

1. A windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, wherein ends of said longitudinal strip are connected to a respective connecting piece, which windscreen wiper device comprises a connecting device for attachment to an oscillating arm, wherein said wiper blade comprises an elongated upper holding part and an elongated lower wiping part of a flexible material, wherein said holding part holds said wiping part, wherein said holding part comprises downwardly extending side arms, seen in cross-section, for holding said wiping part from the outside in a lateral region thereof, wherein said at least one longitudinal groove has an open circumference provided on said holding part at an upper side thereof facing away from said wiping part, and wherein said connecting device comprises an elongated resilient tongue provided with a downwardly extending protrusion oriented perpendicular with respect to said tongue, wherein said strip comprises a hole shaped to correspond with said downwardly extending protrusion on said connecting device, and wherein said connecting device and said strip are interconnected through snapping said protrusion inside said hole by sliding said connecting device onto and in engagement with said holding part or by snappingly mounting said connecting device onto and in engagement with said holding part in a direction transverse to the longitudinal direction of said holding and wherein a spoiler is detachably connected with said holding part at a side facing away from said wiping part.

2. A windscreen wiper device according to claim 1, wherein said connecting device is slidably mounted onto said holding part.

3. A windscreen wiper device according to claim 1, wherein said connecting device is snappingly mounted onto said holding part in a direction transverse to the longitudinal direction of said holding part.

4. A windscreen wiper device according to claim 1, wherein said connecting pieces and said strip are provided with mutually cooperating protrusion and hole features for interconnecting said connecting pieces and said strip through a mutual snapping connection of said protrusion and hole features of said connecting pieces and said strip.

5. A windscreen wiper device according to claim 4, wherein each connecting piece comprises a downwardly extending protrusion serving as said protrusion feature, wherein said strip comprises a correspondingly shaped hole serving as said hole feature, and wherein each connecting piece and said strip are interconnected through snapping said protrusion inside said hole.

6. A windscreen wiper device according to claim 1, wherein said side arms of said holding part pivotally engage said wiping part from the outside in a lateral region thereof.

7. A windscreen wiper device according to claim 1, wherein said wiping part comprises a wiping lip, a neck extending from said wiping lip, as well as an enlarged head extending from said neck, and wherein said enlarged head is mounted into a hollow chamber defined by said side arms of said holding part.

8. A windscreen wiper device according to claim 7, wherein said enlarged head has a circular, elliptical, square, rectangular, rhomboid or heart-shaped cross-section.

9. A windscreen wiper device according to claim 7, wherein said side arms of said holding part comprise inwardly extending end parts, and wherein said neck is located at least partly between said end parts and the enlarged head is located above said end parts.

10. A windscreen wiper device according to claim 7, wherein said hollow chamber includes a lubricant.

11. A windscreen wiper device according to claim 1, wherein said spoiler is provided in one piece with engaging members engaging around longitudinal sides of said holding part.

12. A windscreen wiper device comprising an elastic, elongated carrier element, as well as an elongated wiper blade, which can be placed in abutment with a windscreen to be wiped, which wiper blade includes at least one longitudinal groove, in which groove a longitudinal strip of the carrier element is disposed, wherein ends of said longitudinal strip are connected to a respective connecting piece, which windscreen wiper device comprises a connecting device for attachment to an oscillating arm, wherein said wiper blade comprises an elongated upper holding part and an elongated lower wiping part of a flexible material, wherein said holding part holds said wiping part, wherein said holding part comprises downwardly extending side arms, seen in cross-section for holding said wiping part from the outside in a lateral region thereof, wherein said at least one longitudinal groove has an open circumference provided on said holding part at an upper side thereof facing away from said wiping part, wherein said connecting device and said strip are provided with mutually cooperating protrusion and hole features for interconnecting said connecting device and said strip through mutual snapping connection of said protrusion and hole features, wherein said side arms of said holding part pivotally engage said wiping part from the outside in a lateral region thereof, and wherein said holding part further comprises additional downwardly extending engaging features pivotally engaging said wiping part in an upper region thereof.

13. A windscreen wiper device according to claim 12, wherein said additional engaging features engage an enlarged head of said wiping part.

14. A windscreen wiper device according to claim 13, wherein said additional engaging features comprise a downwardly extending protrusion engaging said enlarged head in a slit thereof.

\* \* \* \* \*